United States Patent
Block et al.

[11] Patent Number: 5,863,500
[45] Date of Patent: Jan. 26, 1999

[54] METHOD AND APPARATUS FOR PRESERVING PRODUCTS

[75] Inventors: Robert S. Block, Marina del Rey; William J. Kommers, Los Angeles, both of Calif.

[73] Assignee: International Manufacturing & Licensing, Inc., Los Angeles, Calif.

[21] Appl. No.: 652,711

[22] Filed: May 30, 1996

[51] Int. Cl.⁶ .................................................. A23B 7/00
[52] U.S. Cl. ............................ 422/40; 422/39; 426/106; 426/392; 426/410; 426/418; 426/419
[58] Field of Search ................... 422/40, 28, 32, 422/43, 42, 39, 292, 295; 99/467; 426/418, 419, 415, 410, 392, 395, 106, 108, 118

[56] References Cited

U.S. PATENT DOCUMENTS

| | | | |
|---|---|---|---|
| 2,611,709 | 9/1952 | Plagge | 99/171 |
| 2,994,424 | 8/1961 | Selby et al. | 206/46 |
| 3,522,057 | 7/1970 | Andersen et al. | 99/103 |
| 3,630,759 | 12/1971 | Rumberger | 426/415 |
| 3,759,722 | 9/1973 | Simon | 426/415 |
| 4,515,266 | 5/1985 | Myers | 206/205 |
| 4,735,308 | 4/1988 | Barner | 206/204 |
| 4,844,243 | 7/1989 | Stiles | 426/119 |
| 4,867,996 | 9/1989 | Twyman | 426/326 |
| 4,886,372 | 12/1989 | Greengrass et al. | 383/100 |
| 4,895,729 | 1/1990 | Powrie et al. | 426/316 |
| 5,093,080 | 3/1992 | Keller | 422/40 |

FOREIGN PATENT DOCUMENTS 710979  6/1954  United Kingdom.

*Primary Examiner*—Hien Tran
*Attorney, Agent, or Firm*—Burns, Doane, Swecker & Mathis

[57] ABSTRACT

Methods and containers for preserving a product such as a respiratory product having an internal vapor pressure. The product is placed into an enclosure, and the enclosure is sealed and pressured with appropriately humidified air or other suitable oxygen containing gas to a positive pressure with respect to ambient pressure to provide a vapor pressure greater than or at least equal to the internal vapor pressure of the product. The volume of the product in relation to the volume of the enclosure and the pressure are such that the enclosure has free air space sufficient to prevent the onset of an anaerobic condition for substantially the storage period of the product assuming the enclosure is maintained approximately at a predetermined temperature. The temperature of the enclosure may be controlled, and may be maintained below the normal freezing temperature of water, and preferably below the normal liquid to solid phase change temperature of the product, but is maintained above the liquid to solid phase change temperature of the product under pressure in the enclosure. Various pressurized packaging methods and structures also are disclosed.

6 Claims, 9 Drawing Sheets

METHOD AND APPARATUS FOR PRESERVING PRODUCTS

BACKGROUND OF THE INVENTION

The present invention relates to the packaging of items under certain conditions, including pressure greater than ambient pressure, where such conditions can be beneficial for purposes such as safeguarding or preserving the item.

The invention may be applicable, for example, to preserving products as described in U.S. Pat. No. 5,093,080 to Elbert G. Keller, in U.S. Pat. No. 2,994,424 to Myer S. Selby et al, or in United Kingdom Patent 710,979 to Bezalel Niedzwiedz. The aforecited Keller patent, for example, describes ways to preserve products which have a cellular respiration and an internal vapor pressure. As is disclosed in the Keller patent, such respiratory products have a partial vapor pressure which is greater than the partial vapor pressure in the surrounding atmosphere, forcing moisture and nutrients to leave the product and resulting in drying and early death or deterioration of the product. In accordance with the patent, a positive pressure gradient with respect to the internal vapor pressure of the product is provided in an enclosed area surrounding the product to negate the outward diffusion of moisture and nutrients of the product.

It will be appreciated that the aforementioned Keller patent provides a way to preserve products without certain of the limitations of the prior art. In addition, it will be appreciated that positive pressure within a container can provide the added benefit of preventing contaminates from readily entering the package. Moreover, internal pressure permits packaging which resists damage to the contents of the package because packaging can be constructed so that the internal pressure adds structural strength to the exterior of the package.

Further consideration of the problem of storing and preserving living organisms, particularly after harvest, has led to the belief that there are a variety of other conditions, especially as they relate to packaging, which affect the preservation of such products. Thus, for example, certain fresh foods stored in such a way that they are completely deprived of oxygen or there is insufficient oxygen for the storage period may cause food poisoning as a result of the onset of an anaerobic condition.

Increasing the pressure in the container will increase the amount of oxygen for a given volume of air space and will thus effectively extend the storage life. This will permit a more efficient use of containers or packages and has the added benefit of permitting the product to be cooled more rapidly since the coefficient of heat transfer by conduction increases with an increase in pressure.

However, there are limits to the extent to which pressure can be increased without adversely affecting some stored products. For example, the cellular structure of strawberries may be damaged by high pressures whereas meat may withstand such pressures without damage. Thus, with a product like meat, the effective free air space may be acceptable despite little remaining volume in the container or package if the pressure is maintained at a high level with respect to ambient pressure.

Another factor which has an effect on the free air space required to avoid an anaerobic condition in a container is the respiration rate of the product in the container. Different products have different respiration rates, and the respiration rate of a particular product also will vary as a function of temperature. Thus, the oxygen in the container will be used at different rates depending on the nature of the product and its temperature. Moreover, the length of time the product is to be preserved in the container will be a factor in determining the amount of free air space needed in the container to avoid an anaerobic condition.

In addition to conditions relating to free air space and the avoidance of an anaerobic condition in the container, other steps may be taken to extend the life of respiratory products. As is noted in the aforementioned Keller patent, pressurization may be used independently or in conjunction with depressed temperature, to preserve such products.

It will be appreciated that under positive pressure the freezing temperature (phase change temperature) for any product is lower than at normal atmospheric pressure. Phase change temperature is the temperature at which the liquid components change from a liquid to a solid and, in the case of water, expands in volume. Such expansion can damage cell structure.

At depressed temperatures the respiration rate of the product is lowered. If the temperature is depressed below the normal freezing temperature of the product at atmospheric pressure but above the freezing temperature of the product under positive pressure, this even lower temperature further depresses the respiration rate and further contributes to the preservation of respiratory products without a change of state from liquid to solid and cellular damage to the product. Thus, using pressure in accordance with the aforementioned patent in conjunction with temperatures below the normal freezing point of the product but insufficiently low to freeze the pressurized product itself will provide beneficial effects while avoiding cellular deterioration of the product.

One problem in conventional systems for pressurizing a product relates to opening a pressurized container. In the aforementioned patents, there is no provision for reducing the pressure of the container before opening the container. Thus, if the pressurized container holds any type of liquid, there is a great likelihood that it will be sprayed on the user when the pressurized package is opened. Accordingly, it would be beneficial to have a package which could be depressurized before being opened.

SUMMARY OF THE INVENTION

It is an object of the present invention to provide packaging methods and apparatus for storing products such as respiratory products and non-respiratory products under positive pressure.

It is another object of the present invention to provide methods and apparatus for creating beneficial pressure and humidity conditions for the storage of products, particularly respiratory products having an internal vapor pressure.

It is another, more specific object of the present invention to provide an improved storage method and apparatus for products such as respiratory and nonrespiratory products in an enclosure wherein the volume of product in the enclosure in relation to the interior volume of the enclosure is limited as a function of conditions such as the type of product, the pressure in the enclosure, the temperature in the enclosure, and the length of time the product will be stored in the enclosure so as to avoid the onset of an anaerobic condition in the container.

It is yet another object of the present invention to provide an improved storage method for products such as respiratory products by pressurizing the product within an enclosed area and maintaining the temperature within the enclosure below the normal freezing temperature of the product at normal atmospheric pressure without freezing the product.

According to one aspect of the present invention, products to be preserved in an enclosure are placed in the enclosure and the interior of the enclosure is pressurized to a positive pressure with respect to ambient pressure. The volume of the product in the enclosure is limited in relation to the interior volume of the enclosure such that the pressurized free air space remaining in the enclosure is sufficient to avoid an anaerobic condition in the container for the length of time the product is to be stored or preserved in the container. More specifically, the volume of the product placed into the enclosure is limited as a function of conditions such as temperature, pressure, and oxygen content in the interior of the enclosure so as to provide a pressurized free air space in the enclosure which is at least sufficient to avoid the onset of an anaerobic condition in the enclosure for the length of time the product is to be stored or preserved in the enclosure. In addition, the volume of the product in the container should be a significant percentage of the interior volume of the container so as to maximize storage efficiency.

According to another aspect of the invention, a product such as a respiratory product is placed in an enclosure with appropriately humidified air and the air pressure within that enclosure is raised to a positive pressure with respect to ambient pressure to provide a positive vapor pressure gradient with respect to the internal vapor pressure of the product. In conjunction with the pressurization of the interior of the enclosure, the temperature within the enclosure is maintained below the normal freezing point of the product at normal atmospheric or ambient pressure, so as to lower the temperature and respiration rate of the product, for example, but the temperature is controlled in conjunction with the pressure so as not to freeze the product, i.e., the temperature is maintained above the temperature at which the liquid product components change from liquid to solid state at the elevated pressure in the enclosure containing the product.

Another aspect of the invention is to provide novel containers and methods of pressurizing the interior of such containers. In accordance with one embodiment, the interior of the container is pressurized by sealing the container and then reducing its volume. In particular, a product is placed in a sleeve of flexible material which is sealed at one end and open at the other end. The open end is sealed and then the interior volume of the sleeve is decreased to increase the interior pressure. A further embodiment involves sealing the flexible material at various locations to create individually sealed compartments so that individual compartments remain sealed when others are opened or depressurized. Other embodiments involve pressurizing the interior of the container through the use of unique container sealing means or by using water to create hydrostatic pressure. Moreover, products may be pressure packaged by adding appropriated conditioned (e.g., humidified) air from a high pressure source such as a disposable or refillable high pressure air container or from an appliance which receives a storage package and injects air into the storage package. In addition, products may be suspended in the container to take advantage of the increased structural strength or rigidity of the container's exterior wall, thereby protecting the product from bruising or other damage.

Exemplary embodiments of the invention also provide the option of depressurizing the storage package prior to opening. Thus, the product remains sealed in the storage package during depressurization. After depressurization, the user can open the storage package which is at ambient pressure so that the product is not sprayed onto the user, as might occur if a pressurized storage package were opened.

An additional aspect of the present invention is the use of pressurized packaging to indicate to the consumer if the integrity of the package has been compromised. If the integrity of the container has been compromised in any fashion, the appearance of the container will be altered and tampering or other container compromise will be apparent.

These and other objects and advantages of the present invention will become apparent from the foregoing discussion and from the following detailed description when read in conjunction with the appended drawings.

DETAILED DESCRIPTION OF THE PREFERRED EMBODIMENTS

Figure 1:
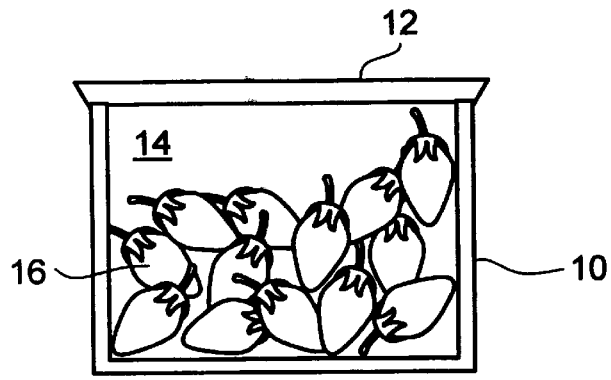
FIG. 1 is a view in cross section illustrating the interior of an enclosure containing a product such as strawberries packaged for preservation in accordance with the present invention.

Referring to FIG. 1, a container 10 is sealed by a removable cover 12 to create a sealed enclosure 14 in which a product 16 such as strawberries may be stored. The product 16 is placed into the container 10 and the cover 12 is closed to create the sealed enclosure 14 around the product, as illustrated. The enclosure 14 is then pressurized, for example as disclosed in the aforementioned Keller patent, so as to provide a positive vapor pressure gradient with respect to the internal vapor pressure of the product. The enclosure preferably is pressurized with air, preferably in a way that provides sufficient humidity to create a desired vapor pressure, although other gas mixtures containing oxygen may be possible.

As was previously mentioned, it is preferred in accordance with the present invention to store the product in such a way that the onset of an anaerobic condition in the enclosure is avoided. Accordingly, the volume of the product 16 in the enclosure 14 is limited so as to leave sufficient pressurized free air space in the enclosure to avoid the onset of an anaerobic condition for the length of time the product 16 is to be stored. Free air space, as used herein, means the volume of air in the enclosure when the air is at positive pressure selected for storage of the product. The amount of free air space required to avoid the onset of an anaerobic condition over the expected storage period of the product will depend on factors such as the pressure and temperature of the enclosure and the respiration rate of the product. Thus, the free air space required to avoid an anaerobic condition for a particular product and storage period at a particular temperature can be determined empirically. The storage period as used herein refers to the period of time the product is to be stored or preserved before opening the container or otherwise permitting air to enter the enclosure. Of course, the free air space required to avoid an anaerobic condition may be minimized when the product 16 is initially placed into the container 10 if the air in the enclosure 14 is changed periodically after the cover 12 is sealed. However, it is preferred that the air is not changed over the period the product is to be preserved because each change of air may cause a loss of nutrients. Therefore, it is preferred that the volume of the product is limited such that the free air space initially is sufficient to prevent the onset of an anaerobic condition for the entire time the product is to be preserved as opposed to some storage period which may be less time. On the other hand, it should be understood that pressurization of the product and selection of the free air space to avoid an anaerobic condition for at least some predetermined storage period, as defined above, is to be considered within the scope of the present invention.

Figure 2A:
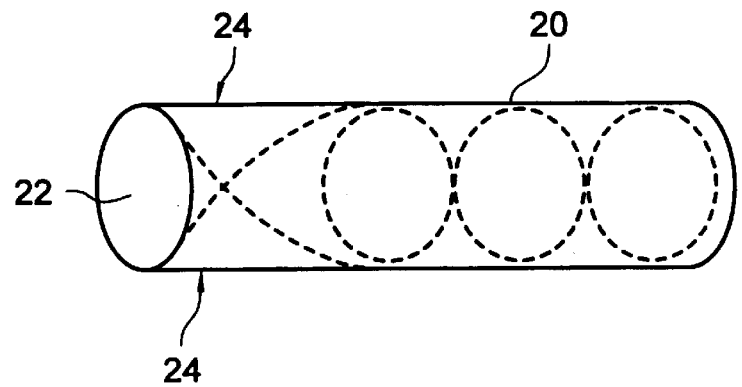
FIGS. 2A and 2B are side views of one embodiment of a container or enclosure for pressurizing and preserving products, in this example, a spherical respiratory product such as tomatoes, in accordance with the present invention.

Referring now to FIG. 2A, a method and a package are illustrated for preserving products which may have a respiration rate and an internal vapor pressure. A flexible material is formed into a package 20 having an opening 22 through which the product may be inserted. The product, for example three tomatoes illustrated in phantom, are placed into the package and the opening 22 is sealed by heat or in any other suitable manner as indicated by the arrows 24. Once sealed, the internal volume of the package is reduced to produce a positive internal pressure with respect to ambient pressure in the enclosure surrounding the product, preferably to provide a positive vapor pressure gradient with respect to the internal vapor pressure of the product.

Figure 2B:
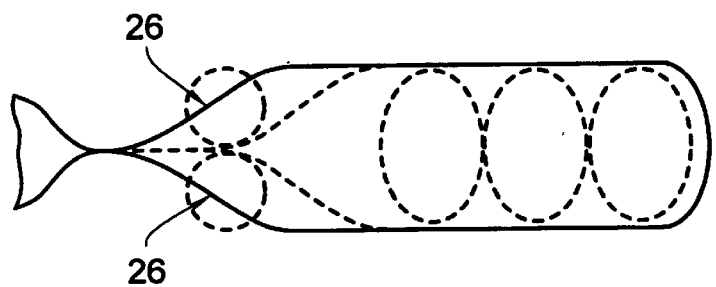

In the illustrated embodiment, the internal volume of the package is reduced by applying pressure to the sides of the package, progressively from the sealed end as illustrated in FIG. 2B until the desired internal pressure is achieved. The relationship between the reduction of volume and the increase in pressure at a given temperature is well known. Similarly, the internal volume of the package may be reduced to increase the pressure by using a packaging material that shrinks upon application of energy such as heat, infra-red, or the like. Thus, a relatively simple packaging method according to the invention may be practiced in the home with relatively inexpensive, tubular plastic packages which can be sealed and progressively reduced in volume, for example by placing the open end 22 of the package 20 between opposing rollers (illustrated in phantom at 26 in FIG. 2B) that prevent the escape of air as the rollers progressively reduce the internal volume of the package.

According to one exemplary embodiment, the pressure inside the package is increased by 1–3 psi, or about 20% of one atmosphere (14.7 psi). Thus, if the product occupies 80% of the volume of the package, only the air occupying the remaining 20% of the volume is compressed. To increase the pressure by 20%, therefore, the total volume of the package is compressed by only 4% (20% pressure increase) ×(20% of the volume of the package).

Figure 6:
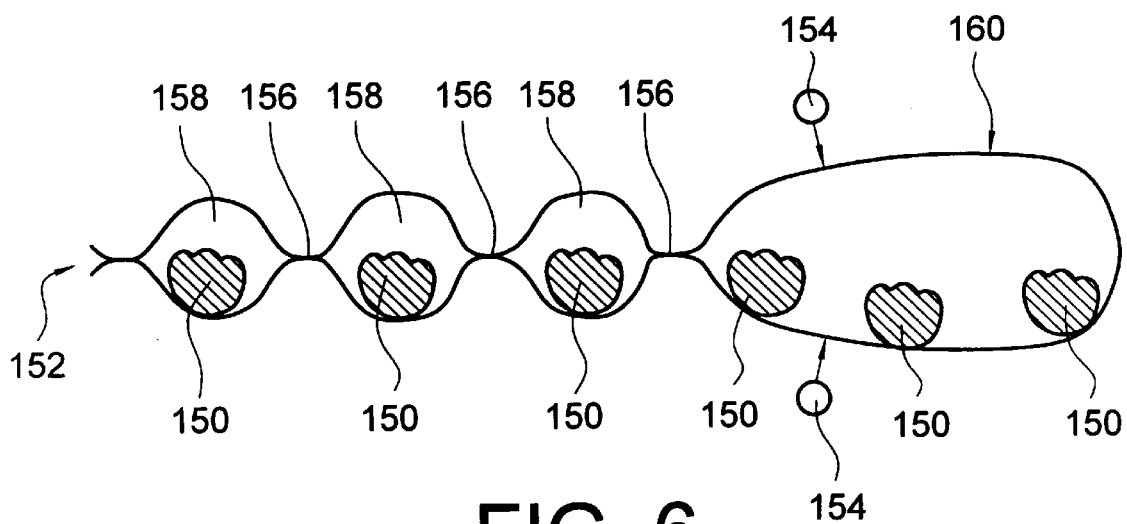
FIG. 6 is a side view of one embodiment of a container for pressurizing products in individualized compartments.

FIG. 6 illustrates another embodiment of the invention in which food or other items are sealed in individual compartments. Initially, the items, e.g., tomatoes 150, may be placed inside a package 160 made of flexible material by way of an opening 152 in the package 160 as shown in FIG. 6. The opening 152 of the package 160 may then be sealed from the external air with a roller 154, for example. The roller 154 or other sealing device may then be applied to intermediate portions 156 of the package between the items 150 so that individual compartments 158 are created for each item 150 or group of items. For example, a number of tomatoes may be sealed in this manner so that the pressurization of each tomato is preserved until its individual compartment is depressurized. The individual compartments also provide additional protection to the articles because each article is isolated from the others.

Figure 3:
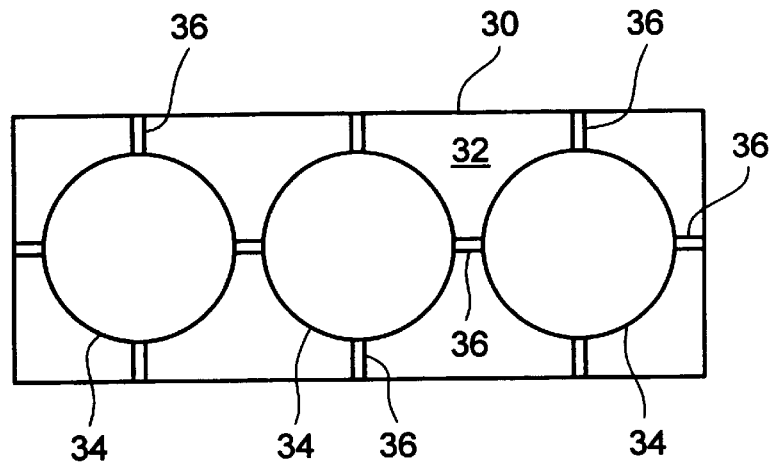
FIG. 3 is a side view in cross section of one embodiment of a container or enclosure for pressurizing and preserving respiratory products such as tomatoes in accordance with the present invention.

FIG. 3 illustrates another container and packaging method according to the present invention which may be used to prevent damage to the product. The container 30 provides an enclosure 32 containing product receiving compartments 34 having the general shape of the product. Ribs or other structural members 36 support the compartments 34 in spaced relation to each other and in spaced relation to the walls of the container. The products are placed in the container and the container is sealed and pressurized. The pressure within the container increases the structural strength of the container so that it holds the shape illustrated without excessive outside wall thickness. Thus, the container can be relatively inexpensive and somewhat flexible, while still protecting the product from bruising and other damage.

Figure 4A:
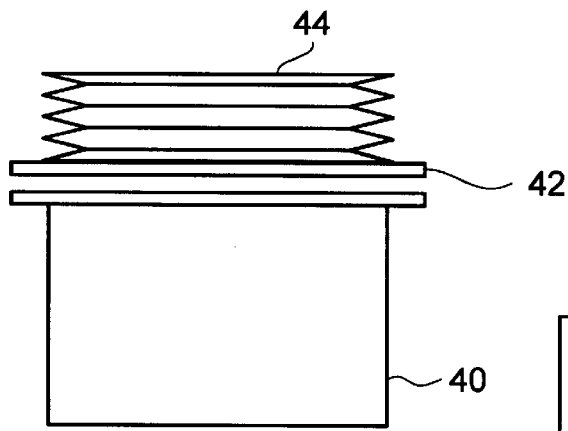
FIGS. 4A, 4B, 4C and 4D are side views in cross section of embodiments of containers in accordance with the present invention in which the interior of the container is pressurized by the action of closing the container.

FIGS. 4A, 4B, 4C and 4D illustrate further embodiments of packages in accordance with the present invention. In FIG. 4A, the package comprises a lower container portion 40 of a relatively non-deformable material and a cover 42 which connects to and seals with the lower container portion 40 in any suitable, conventional manner. The cover has a deformable portion 44 such as a bellows arrangement which can be pressed downward to a lower position and engaged in that lower position thereby to decrease the interior volume of the package after the cover is sealed to the container portion.

Figure 4B:
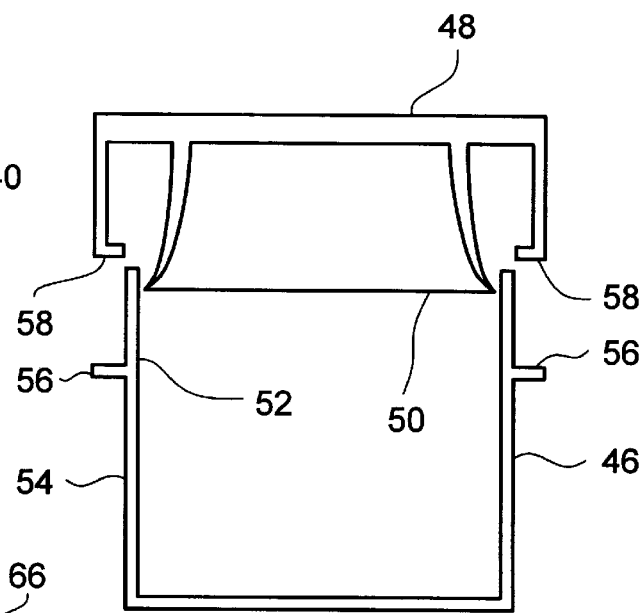

FIG. 4B illustrates another package or container which, like the embodiment of FIG. 4A, includes a bottom container portion 46 and a cover 48 which engages and seals with the bottom portion. The cover 48 has a flexible lip 50 around the entire circumference thereof which engages and seals with the inside surface 52 of the wall of the container portion 46. The outside surface 54 of the wall of the container portion has suitable means such as bayonet fittings 56 which engage cooperating fittings 58 on the cover. When the cover is applied to the container portion, the flexible member 50 seals the cover 48 to the container portion 46 and prevents the escape of air. The action of connecting and turning the cover so that the fittings on the cover engage the container fittings and solidly connect the cover to the container lowers the cover while in sealing engagement and thus compresses the air in the container.

Figure 4C:
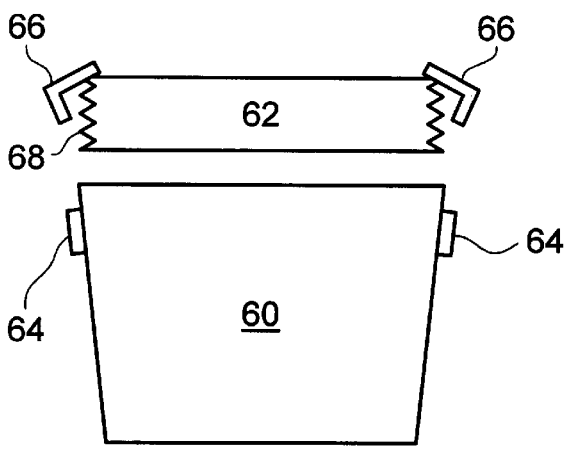
Figure 4D:
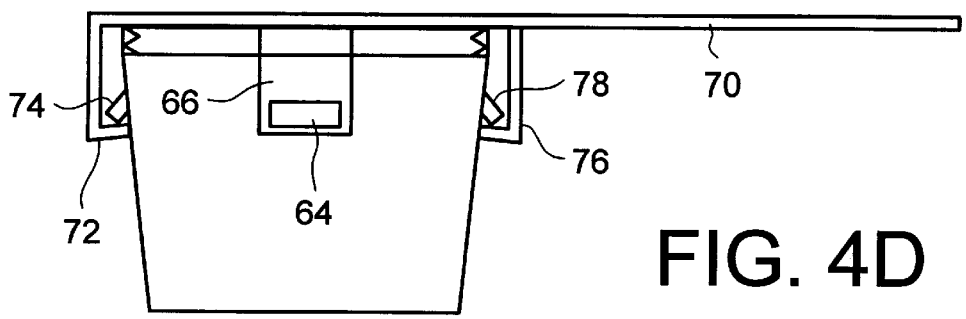

In another embodiment illustrated in FIG. 4C, the package consists of a container portion 60 and a cover 62 . The container portion 60 has male fittings 64 extending outward from each side which engage female fittings (FIG. 4D) or latches 66 on the cover. As with the FIG. 4B embodiment, a flexible member 68 around the periphery of the cover engages the container portion and seals it in a position which then requires further movement of the cover and compression of the air in the container in order to affix the cover to the container portion. As illustrated in FIG. 4D, a tool such as a bar 70 with a hook 72 which cooperates with a projection 74 on the side of the container may be used to depress the cover onto the container and pressurize it. A second hook 76 on the bar 70 may connect with a projection 78 on the side of the container opposite the first projection 74 to permit the cover to be held in place while the latches 66 are secured.

Although not illustrated, various other cover/container combinations using bayonet fittings and the like may be provided to permit a user to readily place a product into a container and pressurize it for storage. In addition, it is contemplated that containers of pressurized and appropriately humidified air may be provided together with a suitable storage container and connecting tool, to permit home pressurization of storage containers. Such pressurized air containers may be disposable or refillable and may contain water vapor and other ingredients. Alternatively, the water may be added to the storage container by passing the air therethrough as it is forced into the sealed storage container. Moreover, it is believed that in some instances it may be beneficial to prevent light from reaching the items in the storage container. In this regard, the storage container may be made of an opaque material to seal off the contents from light.

Although not illustrated, one aspect of the present invention involves controlling the temperature of the enclosure containing the product in conjunction with pressurization such that the temperature in the enclosure is maintained below the normal freezing temperature at which the liquid components of the product normally changes phase from liquid to solid when it is not under pressure, i.e., at ambient or atmospheric pressure. However the temperature is maintained above the liquid to solid phase change temperature of the product under the pressure applied to it in the enclosure. Thus, while the temperature is low enough to substantially reduce the respiration rate of the product, the liquid in the product will not freeze and the product will not undergo cellular damage from freezing. In this regard, the pressure in the enclosure may be monitored and controlled as disclosed in any of the aforementioned or other patents. Any appropriate well known equipment may be used to monitor and control the interior temperature of the enclosure and thus maintain the desired temperature.

Figure 5:
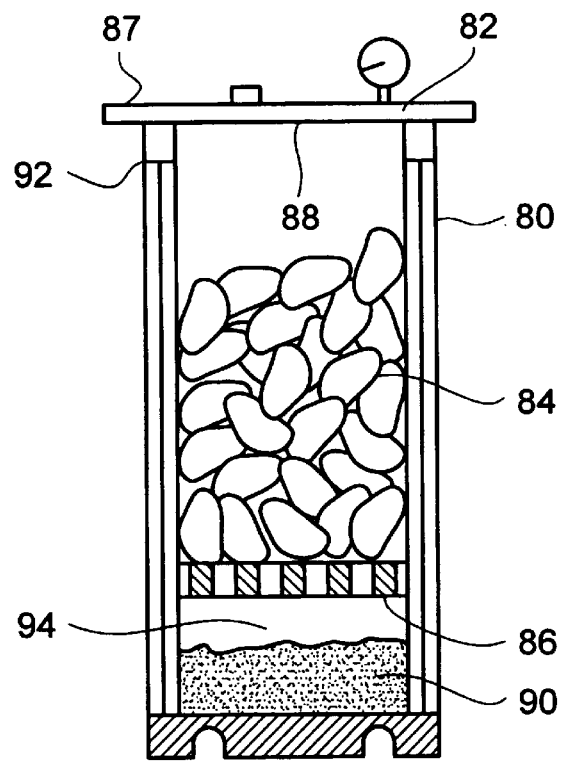
FIG. 5 is a side view in cross section of another embodiment of a container in accordance with the present invention in which beneficial pressure and humidity conditions are hydrostatically created.

FIG. 5 illustrates an embodiment in which a container of food is pressurized hydrostatically. An outer water containment vessel 80 receives an inner pressure and food containment vessel 82 containing food 84 or other product to be stored. The side walls of the inner vessel 82 extend to the bottom of the outer vessel 80 and the food 84 is supported by air pervious bottom 86 well above the bottom of the outer vessel 80. A locking bar 87 locks inner vessel in place so it cannot move upwardly. The locking bar 87 may also lock the cover 88 of the inner vessel in place or the cover 88 may be sealed and connected to the inner vessel walls in any suitable manner.

In operation, the inner vessel is placed inside the outer vessel as illustrated in FIG. 5 and the cover is secured and sealed. The space between the inner and outer vessels is filled with water 90 until a water column 92 of suitable height creates a desired level of pressure within the inner vessel 82. In this regard, the bottom of the inner vessel, in this embodiment defined by the support 86, may be perforated around its periphery to permit water to enter the inner vessel as illustrated. The support 86 is sufficiently high that an air space 94 remains after a sufficient water column has been created. Not only does the water create pressure within the food containment vessel, but it also provides humidity to raise the vapor pressure in the space surrounding the food.

In the embodiments thus described, the pressurization of the interior of the container may serve the additional function of indicating whether the container has been depressurized. For example, it will be obvious from the appearance and shape of the containers shown in FIGS. 2, 3 and 6 whether the containers have been depressurized. Similarly, it will be apparent from an observation of the containers shown in FIGS. 4A–4D whether the integrity of the containers has been compromised.

Figure 7A:
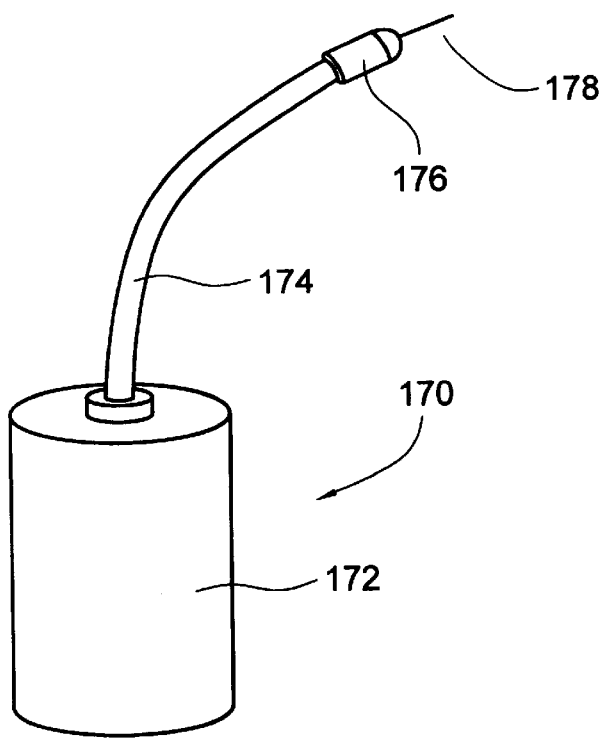
FIG. 7A is a side view of an exemplary canister which may be used to pressurize a storage package.
Figure 7B:
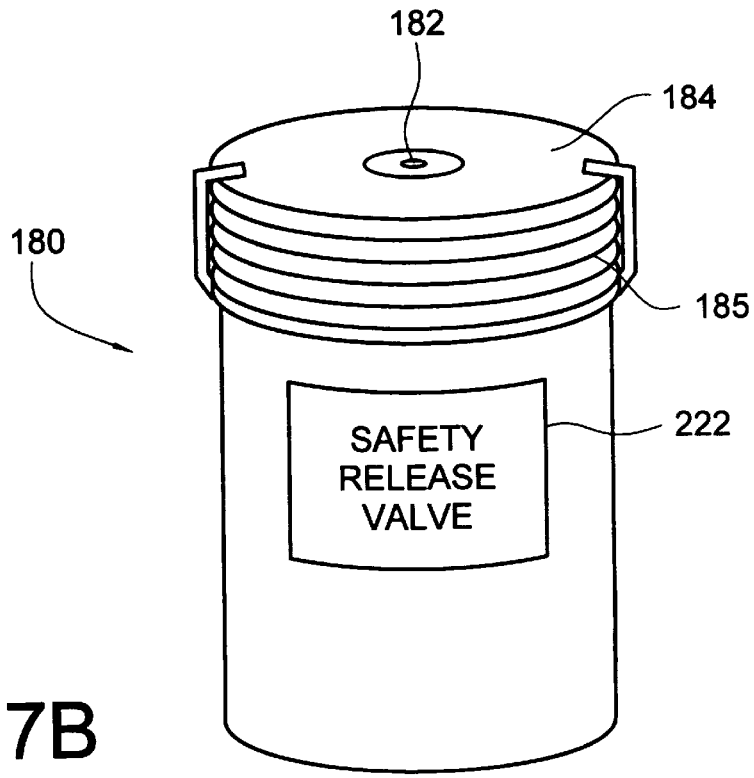
FIG. 7B is a side view of an exemplary storage package which may be pressurized by the canister of FIG. 8A.

According to a further embodiment of the invention, articles can be pressurized in a storage device by means of a canister containing pressurized gas. FIG. 7A shows an exemplary canister 170 which includes a body portion 172, a conduit 174, a pressure control nozzle 176, and a needle 178. The body portion 172 of the canister 170 may contain various pressurized gasses, for example, oxygen, an inert gas, or a combination of the two. In addition, various other ingredients may be included in the pressurized canister 172 for other purposes. For example, vitamins, minerals, antibacterial agents, anti-mold agents, and water vapor can be included in the pressurized canister 172 and injected into a storage package along with the pressurized gas. An exemplary storage package 180, which can be utilized in conjunction with the canister 170, is illustrated in FIG. 7B. The storage package 180 includes a lid 184 which can be removed to place items to be pressurized in the storage package 180 prior to pressurization with the canister 170. As will be described in greater detail below with reference to FIG. 13, the lid 184 may include a pre-compressed portion 185 which can be expanded before opening the storage package 180 so that the pressure inside the storage package is reduced to ambient pressure prior to opening. This advantageous feature prevents the spraying of liquid contents when the storage package is opened.

As different food products and other articles may take different pressures for optimal preservation time, the canister 170 preferably includes an adjustable nozzle or pressure control nozzle 176 which can be adjusted to deliver a desired pressure into the storage package 180. The nozzle 176 can be adjusted to vary the pressure drop across the nozzle to achieve the desired pressure in the storage package 180. The adjustable nozzle 176 may be labeled to identify different settings for different food products so that the user merely sets the nozzle 176 to the desired food product to deliver the proper pressure for that food product into the storage package 180.

At the end of the adjustable nozzle 176, a needle 178 is provided for penetrating a receptacle 182 on the storage package 180. To provide the proper pressure to the storage package 180, the nozzle 176 is set to the correct food product and the needle 178 is inserted into the receptacle 182 much like a soccer ball is filled with air. The needle 178 includes a hole in its end through which the pressurized gasses and other ingredients flow into the storage package 180. Because of the provision of individual canisters 170 which may be filled with various ingredients, the present invention allows the user great flexibility in storing, preserving, and treating food and other products.

Figure 8:
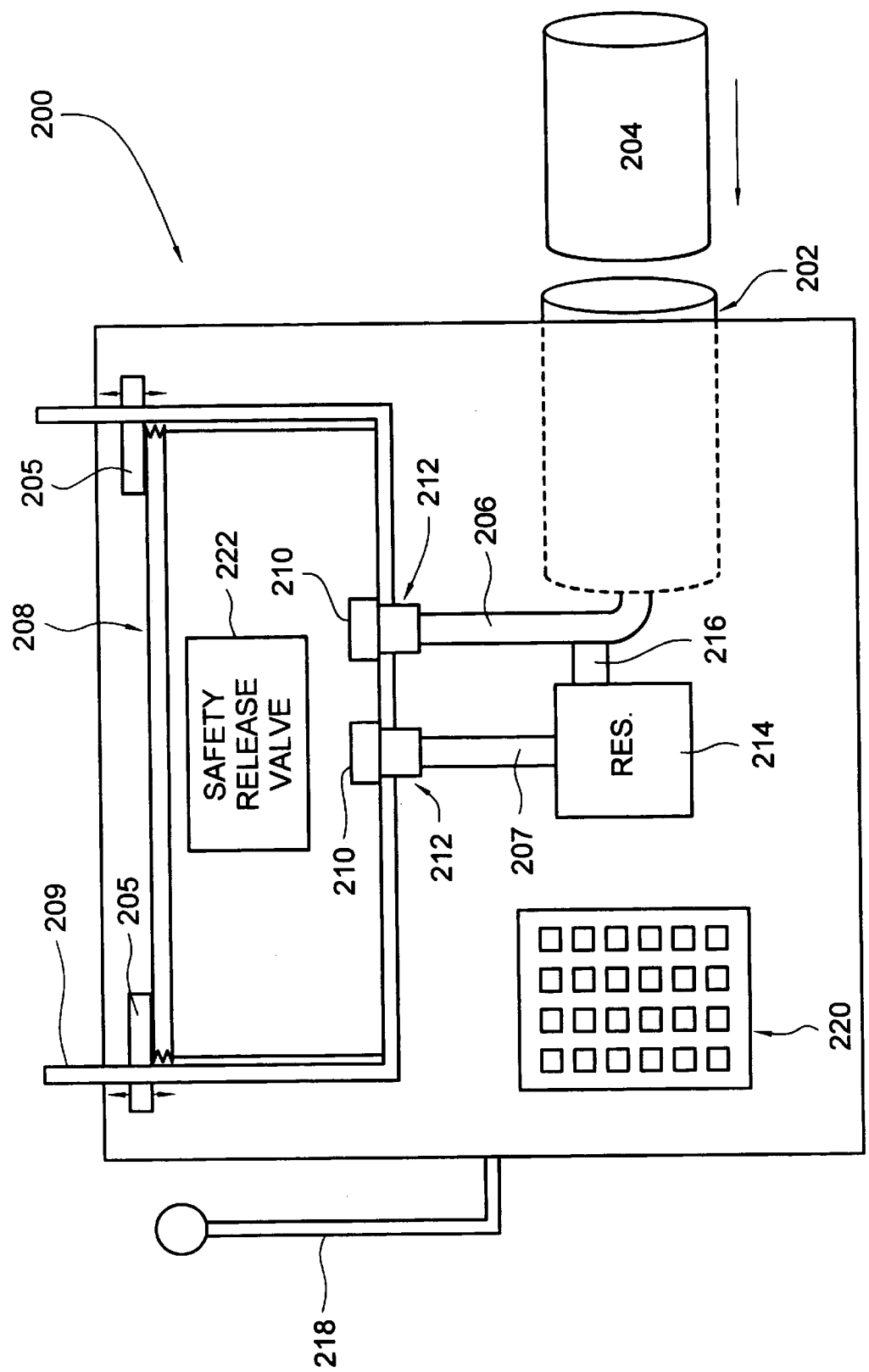
FIG. 8 is a side view of an exemplary appliance which may be used to inject pressurized gas into a storage package.

According to a further embodiment of the invention, an appliance is provided to pressurize food and other products in storage packages. As shown in FIG. 8, the appliance 200 may include a receptacle 202 for receiving a canister 204 or other supply of pressurized gas or other ingredients. The canister 204 preferably includes a valve which is activated after the canister 204 is pushed into the receptacle 202 of the appliance 200. When the valve is activated by pushing the canister 204 into the appliance 200, the pressurized gas flows through a conduit 206 from the receptacle 202 to a storage package 208.

The storage package 208 contains the food to be preserved and is placed in the appliance 200 through a storage package receptacle 209 as shown in FIG. 8. The storage package receptacle 209 is preferably sufficiently large as to allow storage packages of different sizes and shapes to be inserted into the appliance 200 and pressurized. So that the pressurized gas and other ingredients may be injected into the storage package 208, the storage package 208 preferably includes connectors 210 which receive the pressurized gas through internal conduits. The connectors 210 of the storage package 208 mate with reciprocal connectors 212 at the end of the conduits 206 and 207 so that gas inside the canister 204 can pressurize the storage package 208. The storage package can have any shape which allows it to be connected to the connectors 212. The free air space in the storage package 208 is preferably sufficiently large as to avoid an anaerobic condition in the storage package 208 for the length of time the product is to be stored.

A reservoir 214 can be provided to supply water vapor to the storage package 208. For example, a conduit 216 can pass from the conduit 206 which supplies pressurized gas to the storage package 208, to the reservoir 214 and a conduit 207 allows the vaporized pressurized gas to reach the storage package 208. In this way, as the pressurized gas passes through the reservoir 214, the gas becomes moisturized which provides a positive vapor pressure. For products like meat, poultry, and fish, which do not benefit from water vapor, the pressurized gas may pass directly from the canister receptacle 202 to the storage package 208.

To control the pressurization operation on the storage package, a lever arm 218 may be provided which regulates the flow of pressurized gas from the canister 204 to the storage package 208. Thus, a user may pull the lever arm 218 down to varying degrees to attain a certain pressure in the storage package 208. In addition, a keypad 220 can be provided which allows the user to electronically control the pressurization state and ingredients which are injected into the storage package 208.

After the desired pressure and ingredients have been put into the storage package 208, the storage package 208 may be removed in a sealed state for storage. When the connectors 210 and 212 are disconnected, the storage package 208 is automatically sealed so that it can be removed from the appliance 200. A second storage package can then be processed in the same manner with any desired pressure and ingredients.

While exemplary embodiments have been described in which a canister supplies the pressurized gas to the storage package, any suitable device or source which can supply pressurized gas to the storage package may be used in connection with the present invention. Also, gasses or mixtures of gasses other than oxygen and inert gasses may be pressurized and injected into the storage package according to desired properties.

The appliance 200 shown in FIG. 8 may also be adapted to pressurize a variable volume storage package by applying a force to a side of the storage package to reduce its volume. For example, the appliance 200 may include a press 205 which applies a force to a side of a variable volume storage package 208 to reduce its volume. The press may be activated mechanically through the lever arm, for example, or may be activated electronically based on a command entered through the keypad 220. The storage package 208 may also comprise any suitable mechanism such as a latch, activated by the appliance 200, for securing the storage package 208 in the reduced volume state after compression. The storage package 208 may then be removed from the appliance 200 in the reduced volume state for storage.

The storage packages may be designed to safely withstand a certain pressurization. An additional aspect of embodiments of the present invention involves a safety release valve 222 on the storage package, as shown in FIG. 7B and 8, which limits the pressure to a maximum desired value. For example, if a storage package is constructed to operate safely for pressures up to 20 psi, and the storage package is inadvertently overpressurized, the safety release valve 222 allows pressurized gas to escape, either to the desired maximum pressure or to ambient pressure. In this way, the invention provides protection against an explosion caused by overpressurizing a storage package.

An additional aspect of exemplary embodiments of the present invention involves methods and systems for depressurizing the gas inside the storage package prior to opening the storage package. As discussed above, problems may arise when a pressurized container holding a liquid is opened. For example, the user may be sprayed with the liquid.

Figure 9:
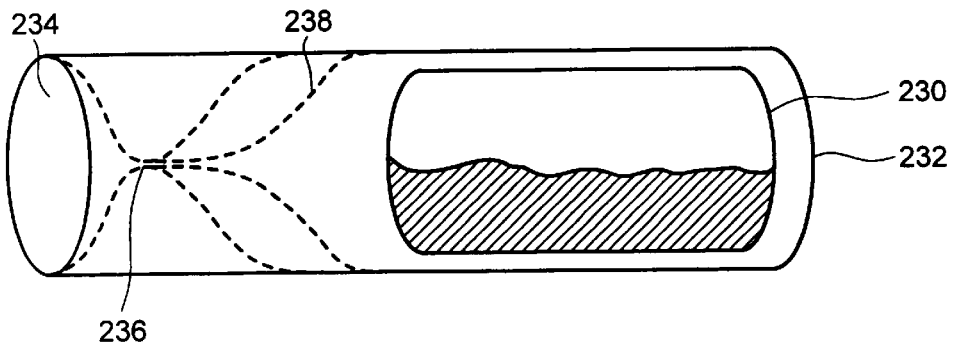
FIGS. 9–12 are illustrations of exemplary storage packages which may be depressurized prior to opening.

FIG. 9 shows one embodiment of a storage package which may be opened after being depressurized. In FIG. 9, an inner container 230 is provided to contain the product to be pressurized, for example, applesauce. The inner container 230 is placed inside an outer container 232 through an opening 234 in one end of the outer container 232. The opening 234 is then sealed at 236, and the interior volume of the outer container 232 is reduced, as represented by the dotted line 238. This may be carried out by the method described above with reference to FIG. 2B. The reduction in volume of the outer container 232 exerts a pressure on the product inside the inner container 230. The inner container 230 is sealed, however, so that when the outer container 232 is depressurized, the contents of the inner container 230 are not sprayed onto the user.

Figure 10:
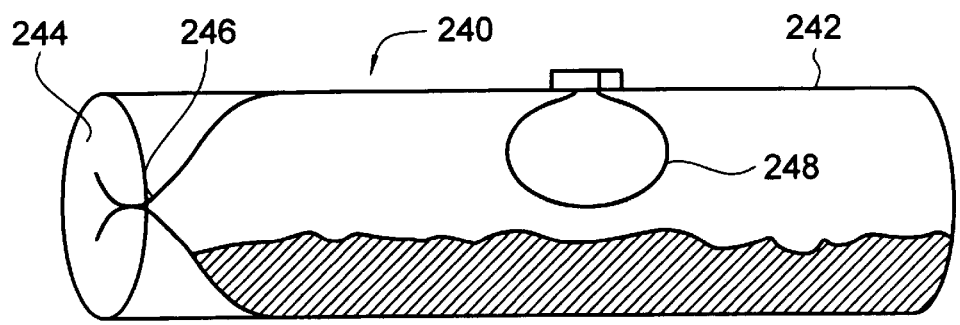

FIG. 10 illustrates another embodiment of the invention which allows the product to be depressurized prior to opening the container. In FIG. 10, the storage package 240 comprises a container 242 which is initially open at one end 244 to allow a user to put a product such as applesauce in the container 242. The open end 244 of the container 242 may then be sealed at 246 with any suitable device, as described above. The storage package 240 also comprises an expansion object 248, e.g., a balloon, which may be expanded from outside of the container 242. For example, air may be forced into the expandable device 248 which comprises a balloon such that the expansion object 248 expands in volume inside the sealed container 242. The air may be injected into the expansion object 248, for example with a conventional needle used for filling a football. Because the expansion object 248 takes up a volume which would otherwise be occupied by the gasses inside the container 242, the pressure in the container 242 is increased.

The expansion object 248 may take other forms. For example, any solid object which occupies a volume may be forced into the storage package 240 to reduce the effective volume of the storage package and, consequently, to increase the pressure inside the storage package 240. A cylindrical, threaded expansion object 248 may be forced into the storage package 240, for example, by screwing the expansion object 248 into a wall of the storage package 240. Thus, as the expansion object 248 is screwed further into the storage package, it occupies a greater volume inside the storage package which pressurizes the interior of the storage package 240. The pressure can be reduced prior to opening the storage package 240 by unscrewing the threaded, cylindrical expansion object 248.

When the user decides to open the package, the expansion object 248 can be reduced to its original volume, e.g., the balloon 248 can be deflated with a needle. This reduces the pressure inside the container 242, for example to ambient pressure, so that when the container 242 is opened, the product inside the container is not sprayed out onto the user.

Figure 11:
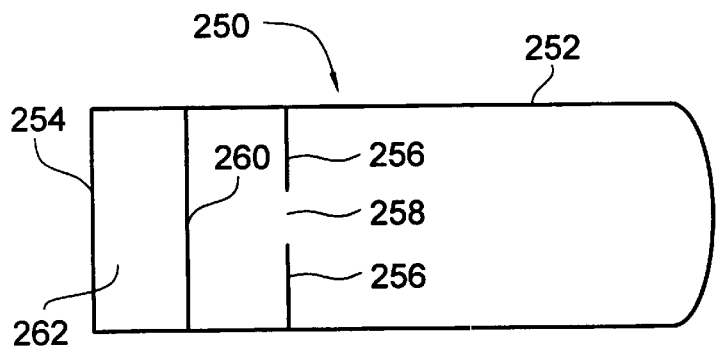

FIG. 11 illustrates another exemplary embodiment of the invention in which the container may be depressurized before being opened. In FIG. 11, a storage package 250 comprises a container 252 having an end 254 into which a product may be inserted for storage. After the product is inserted, a partition 256 may be formed by partially sealing an intermediate portion of the storage package 250. The partition 256 thus has an opening 258 which is not sealed. The end 254 may then be sealed in a conventional manner. Next, another seal 260 is formed proximate to the partition 256. The seal 260 is formed so that a desired quantity of gas resides between the seal 260 and 254, forming a bubble 262. To pressurize the storage package 250, the bubble 262 is forced through the partition 256 which reduces the volume in the container 252 in which the gasses and product reside, resulting in an elevated pressure. After the bubble 262 has been forced through the partition 256, it may be secured in place for storage in any suitable manner, for example, by applying tape to the outer surface of the container 252 adjacent to the partition 256.

When the user decides to open the storage package 250, the bubble 262 may be retracted through the partition 256 to its original position, thus restoring the original unpressurized volume to the storage package 250. The storage package 250 may then be opened without spraying the user.

Figure 12:
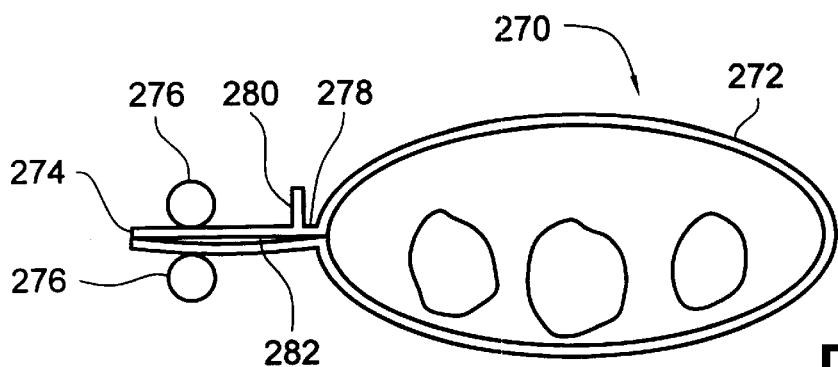

FIG. 12 illustrates another exemplary embodiment of the invention in which the storage package may be depressurized prior to opening. In FIG. 12, the storage package 270 comprises a container 272 having an initially open end 274 into which a product may be inserted. After the product has been inserted, the end 274 may be sealed in a conventional manner. Next, the interior volume of the container 272 is reduced, for example by applying rollers 276 on opposite sides of the container 272. The rollers 276 proceed away from the end 274 of the container 272 to reduce the volume of the container 272. After travelling a desired distance, the container is sealed at 278 so that an elevated pressure exists inside the container 272. In the interior region between seals 278 and 274, there is preferably little or no gas.

When the user decides to open the storage package 270, the user pulls a tab 280 located adjacent to the seal 278. The seal 278 is formed preferably so that it is weaker than the material forming the outer walls of the container 272 so that by pulling the tab 280, the user breaks the seal 278 while the outer wall of the container 272 remains intact. By breaking the seal 278, gasses from the container 272 inflate the region 282 between the ruptured seal 278 and the seal 274. The volume inside the container 272 is thus restored to its original unpressurized volume so that the product can be removed without the risk of spraying the user.

Figure 13:
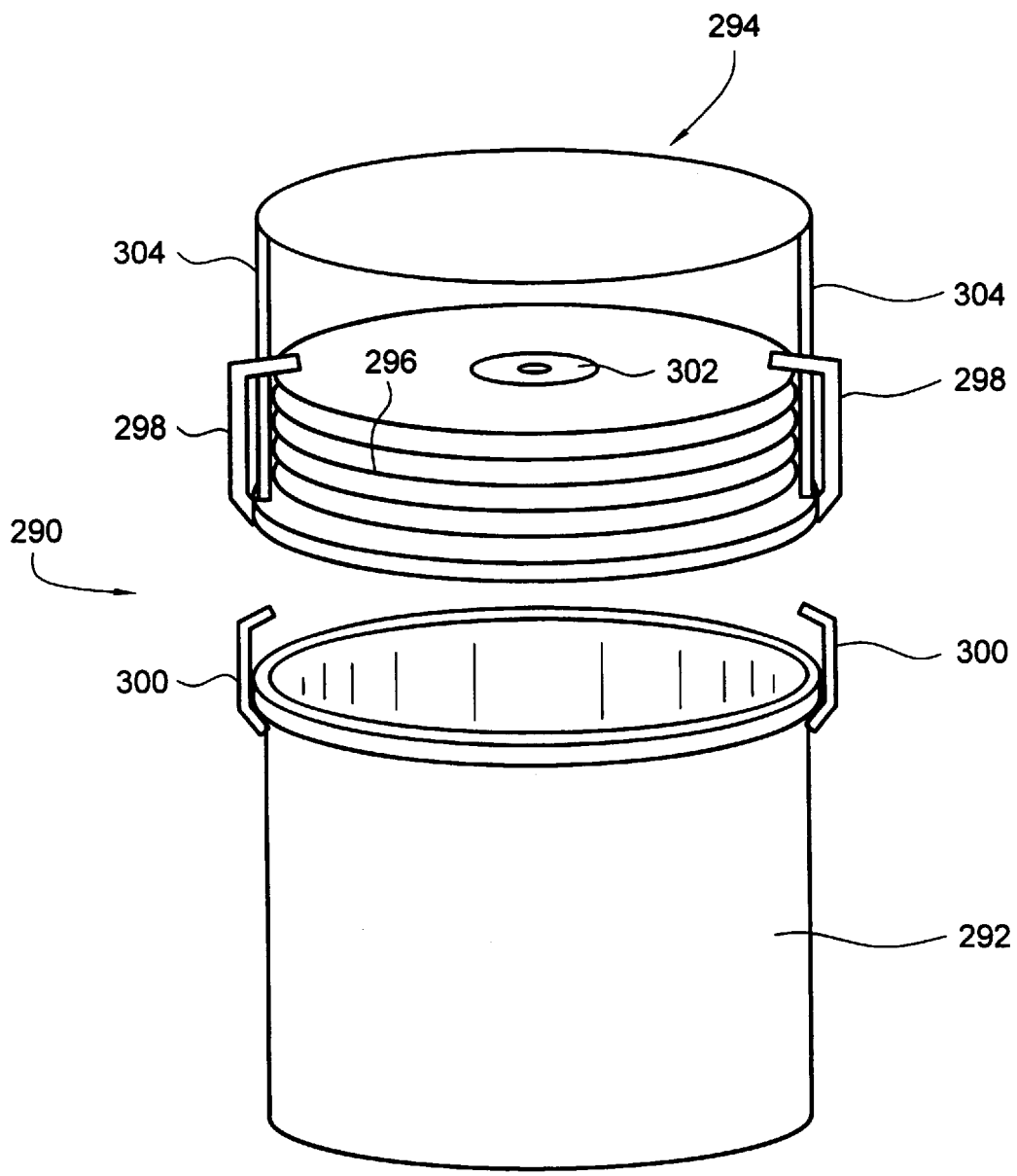
FIG. 13 is an embodiment of a storage package which comprises a pre-compressed lid.

FIG. 13 illustrates another embodiment of the invention which allows a storage package to be depressurized prior to opening. In FIG. 13, a storage package 290 is shown which comprises a container portion 292 and a lid portion 294. The lid portion 294 comprises a mechanism for varying its volume, such as a bellows 296. The bellows portion 296 of the lid 294 is preferably pre-compressed, as shown in FIG. 13, prior to pressurizing the storage package 290. A suitable mechanism such as a latch 298 may be employed to maintain the bellows 296 in the compressed state.

After placing the product in the container portion 292, the lid 294 is secured and sealed to the container portion 292, for example with a closure latch 300. The sealed storage package 290 is then pressurized, for example by injecting a desired gas or gasses into the storage package 290 through a receptacle 302. When the user desires to open the storage package 290, the latches 298 are released so that the bellows 296 of the lid 294 can expand in volume. The pressure inside the storage package 290 is thus reduced prior to opening the storage package by removing the closure latches 300.

An additional aspect of the embodiment shown in FIG. 13 protects the user when the storage package is depressurized. A frame 304 can be constructed on the lid 294 to surround the bellows 296. The frame 304 can be made of a wire mesh, for example, to prevent a user's hand from contacting the lid 294 during pressurization while allowing the user to fill the storage package through the receptacle 302. Thus, when the latches 298 are removed to depressurize the storage package 290, the bellows 296 expands rapidly within the frame 304. The frame 302 thus defines an outer surface of the lid which is stationary during expansion of the bellows 296 so that the rapid expansion of the bellows 296 does not affect the user.

Figure 14A:
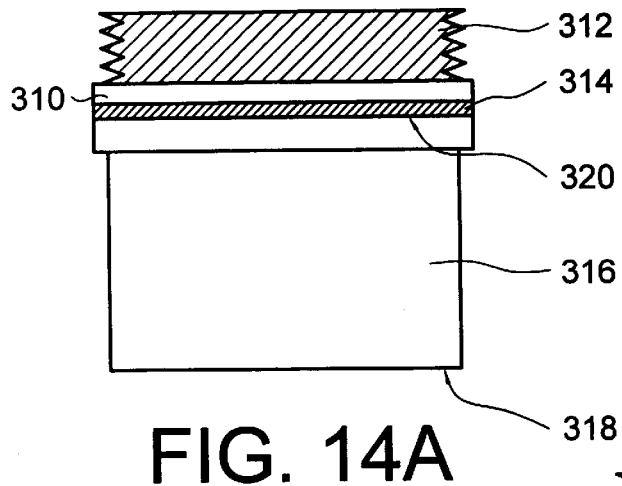
FIGS. 14A, 14B, 14C and 14D show exemplary storage packages having lids which may be depressurized prior to opening.
Figure 14B:
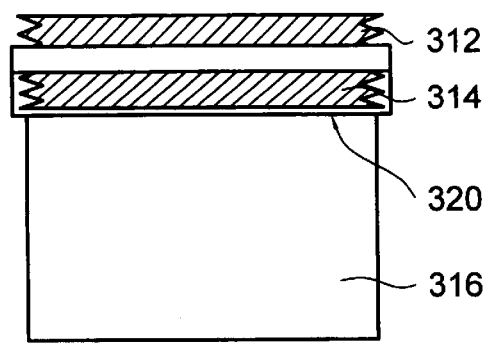

FIGS. 14A–14D illustrate an embodiment of the invention comprising a novel lid structure. As shown in FIG. 14A, the lid 310 comprises an upper bellows 312 and a lower bellows 314. After the lid 310 is sealed to the container portion 316, the upper bellows 312 may be compressed as shown in FIG. 14B. The compression of the upper bellows 312 exerts a pressure on the lower bellows 314 causing it to expand towards the container portion 316, as shown in FIG. 14B. The volume between the floor 318 of the container portion 316 and the floor 320 of the lower bellows 314 is thus reduced, which increases the pressure in the container portion 316. The upper bellows 312 may be secured in the compressed position shown in FIG. 14B for storage in any suitable manner.

When the user desires to open the container, the upper bellows 312 is first allowed to expand to its unpressurized position, as shown in FIG. 14A. This allows the lower bellows 314 to contract to its depressurized position as shown in FIG. 14A. The lid 310 may then be removed from the depressurized container portion 316 without risk of spraying the user with the contents of the container portion. The gasses above the floor 320 of the lower bellows thus do not interact with the contents of the container portion 316.

Figure 14C:
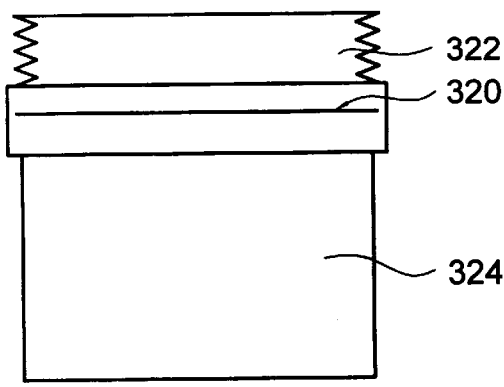
Figure 14D:
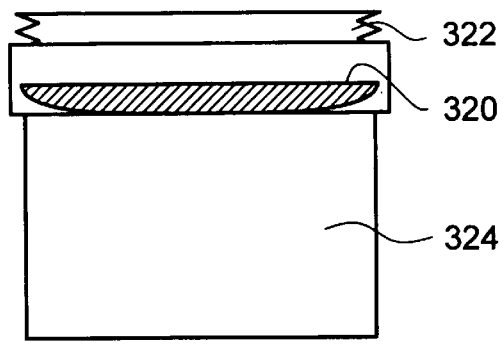

FIGS. 14C and 14D illustrate a variation of the embodiment shown in FIGS. 14A and 14B. In FIGS. 14C and 14D, the lower bellows has been replaced with a diaphragm 320. When the upper bellows 322 is compressed, the diaphragm 320 is forced toward the container portion 324 thus increasing the pressure in the container portion for storage. Before the container portion 324 is opened, the upper bellows 322 is allowed to expand to its original volume, which allows the diaphragm 320 to assume its original, unpressurized position, as shown in FIG. 14C. The lid may then be removed in a depressurized state so that the product is not sprayed on the user. As in the embodiment of FIGS. 14A and 14B, the gasses above the diaphragm 320 do not interact with the contents of the container portion 324.

Figure 15:
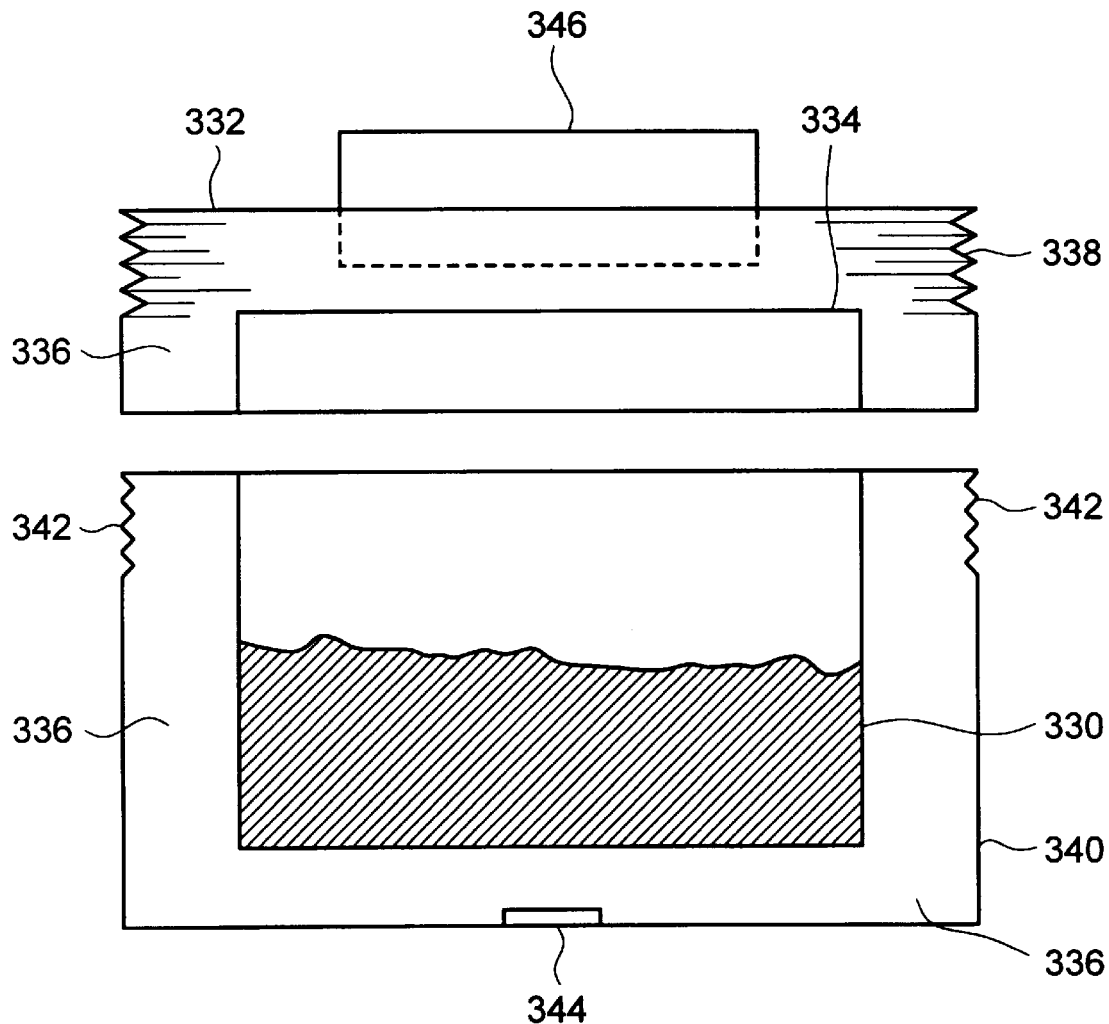
FIG. 15 is an illustration of an exemplary storage package which may be depressurized prior to opening.

FIG. 15 shows another embodiment of the invention in which the storage package may be depressurized prior to opening. In FIG. 15 an inner container 330 is disposed within an outer container 340. The product to be stored is put into the inner container 330. The inner container 330 is preferably relatively flexible and the outer container 340 relatively rigid. For example, the walls of the inner container 330 may be made of any suitable material which bows inward under pressure.

A lid 332 is provided to seal the inner container 330 and includes an inner portion 334 which seals the top of the inner container 330. After the inner container 330 is sealed, the volume 336 between the inner container 330 and the outer container 340 is pressurized, which exerts a pressure on the flexible inner container 330. This may be accomplished in a number of ways. For example, the volume 336 may be pressurized by reducing its volume. The volume 336 may be reduced by compressing a corrugated section 338 of the lid 332. Because the volume 336 between the inner container 330 and the outer container 340 is reduced, a pressure is exerted on the inner container 330 such that its walls bow inwardly. Because the walls bow inwardly, the volume of the inner container 330 is reduced, which increases the pressure in the inner container 330. The pressure can be released by expanding the corrugated portion 338 prior to opening the inner container 330 so that when the inner container is opened 330, it is at ambient pressure.

Another exemplary method of reducing the volume 336 between the inner container 330 and the outer container 340 involves screwing the lid 332 onto the outer container 340. First, the inner portion 334 of the lid is sealed to the inner container 330. Next, the lid is screwed onto threads 342 such that the volume 336 between the inner container 330 and the outer container 340 is reduced and a pressureis exerted on the flexible inner container 330. When the lid 332 is unscrewed, the pressure returns to ambient pressure, which allows the inner container 330 to be opened without the risk of spraying the contents on the user.

According to another embodiment, the inner portion 334 of the lid is sealed to the inner container 330 and the lid 332 is then sealed to the outer container 340. At this point, both the inner container 330 and the outer container 340 are at ambient pressure. Next, a desired pressurized gas is injected through a receptacle 344, for example with a canister of pressurized gas having a needle. The pressurized gas occupies the volume 336 between the inner container 330 and the outer container 340, which exerts a pressure on the inner container 340, pressurizing its contents. When the user decides to open the storage package, a needle is inserted into the receptacle 344 which releases the pressure between the inner container 330 and the outer container 340. The inner container 330 can then be opened at ambient pressure.

Another exemplary embodiment involves forcing an object such as a piston into the volume 336 between the inner container 330 and the outer container 340 after the inner container and outer container have been sealed. As described above with respect to FIG. 10, and as shown in FIG. 15, the piston 346 occupies a volume between the inner container 330 and the outer container 340 which would otherwise be occupied by gas. This increases the pressure in the volume 336 and exerts a pressure on the flexible inner container 330 which pressurizes its contents. When the storage package is to be opened, the piston 346 or other object is withdrawn from the volume 336 between the inner container 330 and the outer container 340 which reduces the pressure in the volume 336 between the inner container 330 and the outer container 340 to ambient pressure. The inner container 330 can then be opened without risk of spraying.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A method for preserving a respiratory product having an internal vapor pressure which comprises:

placing the product into a flexible package with an open end, and pressurizing the flexible package by sealing the open end of the flexible package and thereafter decreasing an internal volume of the flexible package in order to provide a positive pressure with respect to ambient pressure and to provide a positive vapor pressure gradient to the internal vapor pressure of the product, wherein a volume of the product in relation to a volume of the flexible package and the pressure within said flexible package being such that the flexible package has free air space sufficient to prevent the onset of an anaerobic condition for at least a storage period of the product when the flexible package is maintained approximately at a predetermined temperature, and wherein prior to opening the package, the internal volume of the flexible package is increased while the flexible package remains sealed.

2. The method of claim 1, further including the step of controlling the temperature of the flexible package.

3. The method of claim 1, further comprising the step of placing the product in a flexible container prior to placing the product with the flexible container into the flexible package.

4. A method of packaging a product comprising the steps of:

placing a product into a flexible package;

sealing the flexible package so as to be air tight;

thereafter reducing an internal volume of the flexible package to produce a positive pressure, with respect to ambient pressure, inside the package surrounding the product and thereby prolonging storage life of the product; and increasing the internal volume of the flexible package while the flexible package remains sealed, prior to opening the package.

5. The method of claim 4, wherein the internal volume of the package is reduced by making said flexible package of a material which decreases in area upon application of energy thereto, and applying said energy to the package after it is sealed.

6. The method of claim 4, wherein the internal volume of the package is reduced sufficiently to raise an internal vapor pressure of the package to a level greater than an internal vapor pressure of the product.

* * * * *